United States Patent
Nakajima

(10) Patent No.: US 10,732,551 B2
(45) Date of Patent: Aug. 4, 2020

(54) CONTROL DEVICE, IMAGE FORMING APPARATUS, AND CONTROL METHOD

(71) Applicant: Mikio Nakajima, Kanagawa (JP)

(72) Inventor: Mikio Nakajima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/514,265

(22) Filed: Jul. 17, 2019

(65) Prior Publication Data
US 2020/0033763 A1    Jan. 30, 2020

(30) Foreign Application Priority Data

Jul. 27, 2018  (JP) ................... 2018-141848

(51) Int. Cl.
*G03G 15/20*    (2006.01)
*G03G 15/00*    (2006.01)

(52) U.S. Cl.
CPC ....... *G03G 15/205* (2013.01); *G03G 15/5004* (2013.01)

(58) Field of Classification Search
CPC ............. G03G 15/205; G03G 15/5004; H04N 1/00896; H04N 1/00899
See application file for complete search history.

(56) References Cited

U.S. PATENT DOCUMENTS

| | | | |
|---|---|---|---|
| 2011/0286027 A1* | 11/2011 | Nozawa | G03G 15/502 358/1.14 |
| 2014/0270836 A1 | 9/2014 | Chosokabe et al. | |
| 2018/0041655 A1 | 2/2018 | Nakajima | |
| 2018/0267447 A1* | 9/2018 | Kato | G03G 15/2039 |

FOREIGN PATENT DOCUMENTS

| | | |
|---|---|---|
| JP | 2004-294855 | 10/2004 |
| JP | 2006-011319 | 1/2006 |
| JP | 2006-189744 | 7/2006 |

* cited by examiner

*Primary Examiner* — Sandra Brase
(74) *Attorney, Agent, or Firm* — IPUSA, PLLC

(57) ABSTRACT

A control device is configured to control an image forming apparatus to form an image on a recording medium. The control device includes circuitry configured to acquire a consumed direct current (DC) power value that is a DC power value consumed in the image forming apparatus, estimate a characteristic of the consumed DC power value in a period in which an image is formed on at least one recording medium, and determine a limit value of fixing power to be supplied to a fixing device of the image forming apparatus that fixes an image on a recording medium, to have cyclicity corresponding to the characteristic of the consumed DC power value.

12 Claims, 10 Drawing Sheets

CONTROL DEVICE, IMAGE FORMING APPARATUS, AND CONTROL METHOD

CROSS-REFERENCE TO RELATED APPLICATION

This patent application is based on and claims priority pursuant to 35 U.S.C. § 119(a) to Japanese Patent Application No. 2018-141848, filed on Jul. 27, 2018, in the Japan Patent Office, the entire disclosure of which is hereby incorporated by reference herein.

BACKGROUND

Technical Field

The present invention relates to a control device, an image forming apparatus, and a control method.

Discussion of the Background Art

Conventionally, an image is thermally fixed after formed on a recording medium in an image forming apparatus.

For example, there is an image forming apparatus that controls power of fixing heaters that perform thermal fixing on the basis of a state of a staple-sortable finisher coupled to the image forming apparatus. In this image forming apparatus, part or all of the fixing heaters are turned off during a staple operation that requires a large amount of power consumption.

SUMMARY

In an aspect of the present disclosure, there is provided a control device configured to control an image forming apparatus to form an image on a recording medium. The control device includes circuitry configured to acquire a consumed direct current (DC) power value that is a DC power value consumed in the image forming apparatus, estimate a characteristic of the consumed DC power value in a period in which an image is formed on at least one recording medium, and determine a limit value of fixing power to be supplied to a fixing device of the image forming apparatus that fixes an image on a recording medium, to have cyclicity corresponding to the characteristic of the consumed DC power value.

In another aspect of the present disclosure, there is provided an image forming apparatus including the control device.

In still another aspect of the present disclosure, there is provided a method for controlling an image forming apparatus that forms an image on a recording medium. The method includes acquiring, estimating, determining, and outputting. The acquiring includes acquiring a consumed direct current (DC) power value that is a DC power value consumed in the image forming apparatus. The estimating includes estimating a characteristic of the consumed DC power value in a period in which an image is formed on at least one recording medium. The determining includes determining a limit value of fixing power that is power to be supplied to a fixing device of the image forming apparatus that fixes an image on a recording medium, to have cyclicity corresponding to the characteristic of the consumed DC power value. The outputting includes outputting a command to supply the fixing power to the fixing device at a value not greater than the limit value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
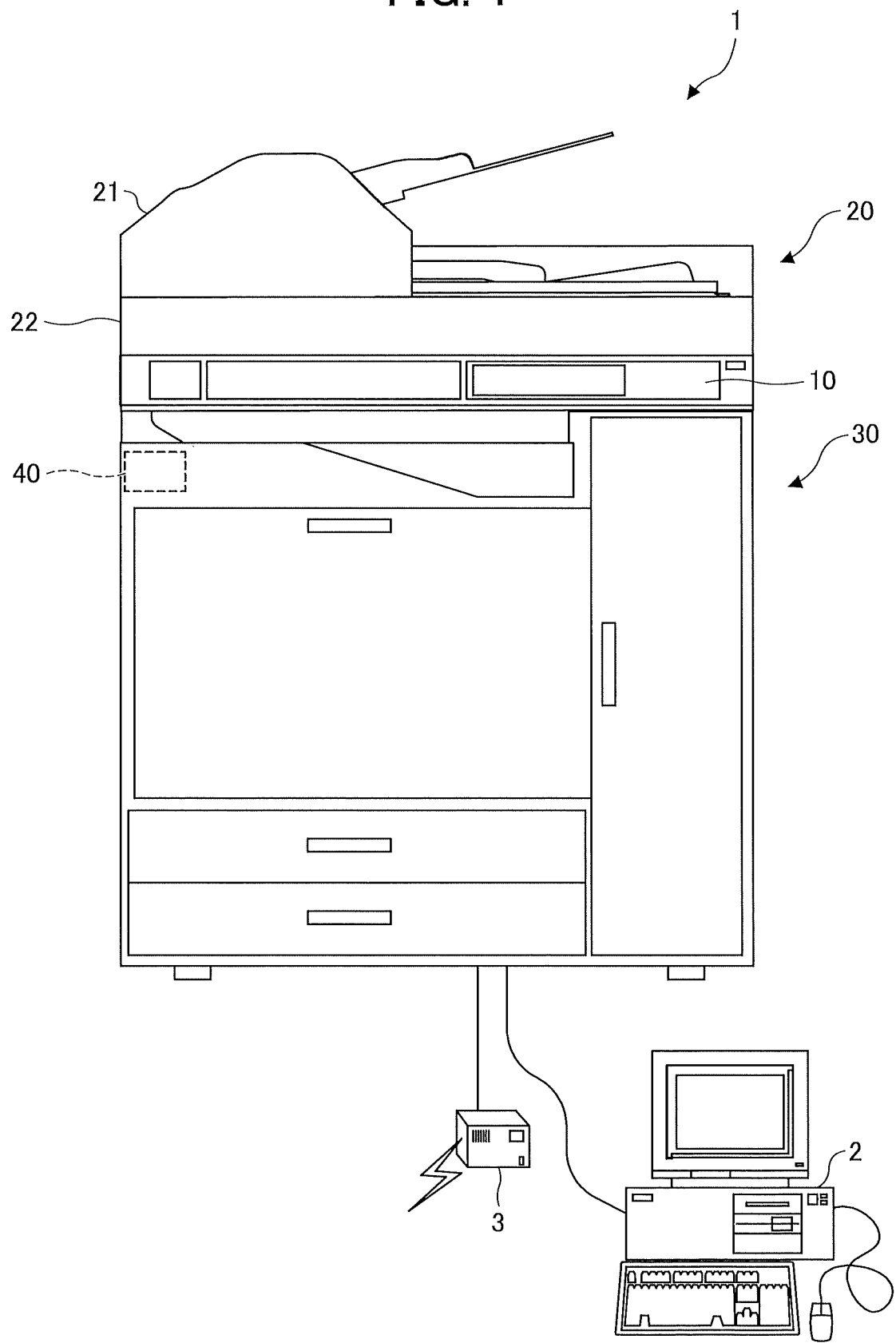
FIG. 1 is a side view illustrating an example of a configuration of an image faulting apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present invention will be described with reference to the accompanying drawings. In the present specification and the drawings, constituent elements having substantially the same functional configurations are denoted by the same reference numerals to omit redundant description.

First Embodiment

<Configuration of Image Forming Apparatus 1>

A configuration of an image forming apparatus 1 according to a first embodiment will be described. FIG. 1 is a side view illustrating an example of a configuration of the image forming apparatus 1 according to the first embodiment. The image forming apparatus 1 according to the present embodiment is an electrophotographic image forming apparatus and will be described as a multifunctional copying machine that forms an image on a recording medium. That is, the multifunctional copying machine is an example of the image forming apparatus. The image forming apparatus may be any apparatus that forms an image on a recording medium, and may be, for example, a simple copying machine or printing machine. The recording medium may be any recording medium as long as an image can be formed on a surface of the recording medium. Examples of the recording medium include, but are not limited to, sheet materials such as paper, cloth, film, and plate.

The image forming apparatus 1 according to the present embodiment can generate data of information read from the recording medium such as paper or can form an image of the information on the recording medium. Furthermore, the image forming apparatus 1 can forming on the recording medium, an image of information acquired from a computer device 2 such as a personal computer (PC), and an image of information acquired through a telephone line via a private branch exchanger (PBX) 3 or the like. That is, the image forming apparatus 1 has a scanner function, a copying function, a printer function, and a facsimile function. The image forming apparatus 1 switches the functions and operates in a mode of the switched function in response to an input of a user on an operation board 10 described below.

The image forming apparatus 1 includes the operation board 10, an image reader 20, a printer 30, and a control device 40. The operation board 10 is an interface that receives a command related to the operation of the image forming apparatus 1 from the user, and includes, for example, a display, a touch panel, and buttons. The image reader 20 reads information on the recording medium and outputs the read information as image data to the printer 30 and the like. The printer 30 forms a toner image on the basis of the image data, and prints the toner image on the recording medium stored in the image forming apparatus 1. In the present embodiment, the recording medium is paper. The image data acquired by the printer 30 is the image data acquired by the image reader 20, the image data acquired from the computer device 2, or the image data acquired through the PBX 3.

The image reader 20 includes an auto document feeder (ADF) 21 and an image reading device 22. The ADF 21 sequentially sends a paper document disposed on the ADF 21 to the image reading device 22. The image reading device 22 acquires image data from a surface of each paper document sent from the ADF 21 and outputs the image data to the printer 30 or the control device 40. The printer 30 prints the image data on paper, and the control device 40 sends the image data to an external destination via the PBX 3 or sends the image data to the computer device 2. The operation board 10, the ADF 21, the image reading device 22, and the printer 30 are configured in a mutually couplable or separable manner.

The control device 40 controls the overall operation of the image forming apparatus 1. For example, the control device 40 includes a computer such as a microcomputer. The control device 40 controls the operation of the image reader 20 and the printer 30. The control device 40 controls the operation of the image forming apparatus 1 in each of the scanner function, the copying function, the printer function, and the facsimile function on the basis of the command input to the operation board 10.

Figure 2:
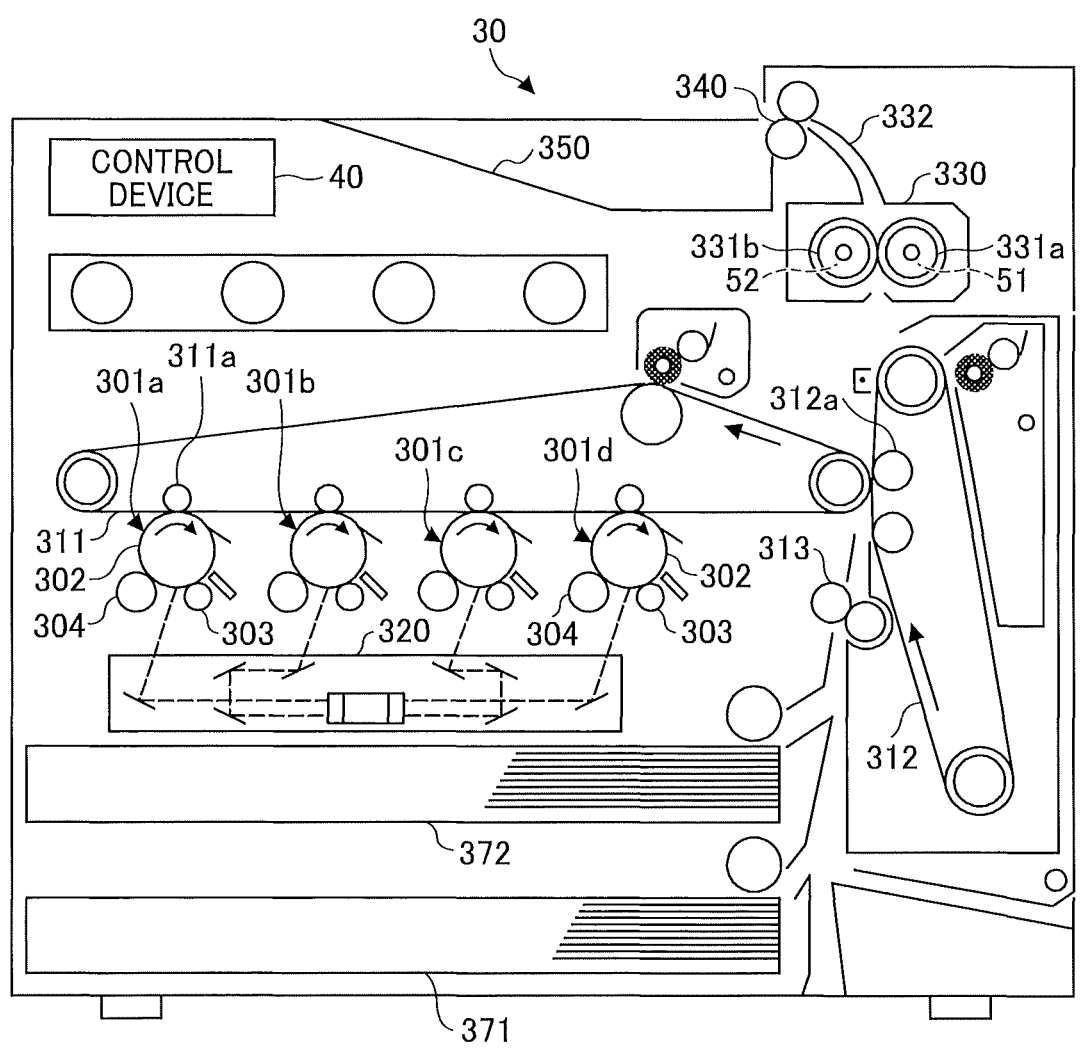
FIG. 2 is a side view illustrating an example of a configuration of a printer of the image forming apparatus in FIG. 1.

Further, a detailed configuration of the printer 30 will be described. In the present embodiment, the printer 30 is described as a laser color printer. FIG. 2 is a side view illustrating an example of a configuration of the printer 30 of the image forming apparatus 1 in FIG. 1. In FIG. 2, the printer 30 is drawn through the inside. As illustrated in FIG. 2, the printer 30 includes four sets of toner image forming units 301a to 301d for forming images in respective colors of magenta (M), cyan (C), yellow (Y), and black (K), a first transfer belt 311, a second transfer belt 312, an exposure device 320, and paper feeding units 371 and 372.

The exposure device 320 irradiates respective charged photoconductors 302 of the toner image forming units 301a to 301d with light corresponding to the image data acquired from the image reading device 22 or the like to form electrostatic latent images on respective surfaces of the photoconductors 302. An example of the exposure device 320 is an exposure device by a laser scanning method that emits a laser beam or by a light emitting diode (LED) writing method that emits LED light. The exposure device 320 irradiates the respective surfaces of the uniformly charging photoconductors 302 with light corresponding to formation of a full color image as latent images.

The first transfer belt 311 and the second transfer belt 312 are endless belts wound around a plurality of rollers, and move around the plurality of rollers. The first transfer belt 311 and the second transfer belt 312 are supported and stretched between a rotatable support roller and a rotatable drive roller. The first transfer belt 311 is pressed against the four photoconductors 302 of the toner image forming units 301a to 301d by four first transfer rollers 311a disposed inside the loop. The second transfer belt 312 is pressed against the first transfer belt 311 and the support roller or the drive roller of the first transfer belt 311 and is in contact with the first transfer belt 311 by a second transfer roller 312a disposed inside the loop. Such first transfer belt 311 and second transfer belt 312 form a predetermined transfer nip.

The latent images of the respective photoconductors 302 of the toner image forming units 301a to 301d are transferred onto the first transfer belt 311 as toner images, and the toner images on the first transfer belt 311 are transferred onto the second transfer belt 312. The second transfer belt 312 transfers the toner images on the second transfer belt 312 onto a transfer sheet (hereinafter, also simply referred to as a "sheet") that is paper stored in the paper feeding unit 371 or 372.

The toner image forming units 301a to 301d are disposed in this order along a circumferential movement direction of the first transfer belt 311. In the present embodiment, the toner image forming units 301a to 301d are disposed below the first transfer belt 311, and the exposure device 320 is disposed below the toner image forming units 301a to 301d. In the present specification, "above" and "below" indicate directions when the image forming apparatus 1 is disposed on a horizontal support surface. Such an image forming apparatus 1 constitutes a full color image forming apparatus by a four-drum system (also referred to as "tandem system").

Each of the toner image forming units 301a to 301d includes the rotatably supported photoconductor 302, a charging device 303, and a developing device 304. The charging device 303 and the developing device 304 are disposed on an outer peripheral surface of the photoconductor 302.

Each photoconductor 302 holds the first transfer belt 311 together with the first transfer rollers 311a and is in contact with the first transfer belt 311. For example, the photoconductor 302 is a drum-shaped member. The charging device 303 uniformly charges the surface of the photoconductor 302 so that the toner easily adheres to the surface. The developing device 304 supplies a toner to the surface of the charged photoconductor 302 to cause the toner to adhere to the latent image formed by the exposure. Thereby, the latent image is developed to form a toner image. The colors handled by the developing devices 304 of the toner image forming units 301a to 301d are different from one another, and are magenta, cyan, yellow, and black. A space where the light emitted from the exposure device 320 enters the photoconductor 302 is secured between the charging device 303 and the developing device 304.

The sheet is accommodated in the paper feeding units 371 and 372. Uppermost sheets on the paper feeding unit 371 or 372 are taken out sheet by sheet by the paper feeding roller and conveyed to a registration roller 313 through a plurality of sheet guides. The registration roller 313 conveys the conveyed sheet to between the first transfer belt 311 and the second transfer belt 312. In the present specification, conveyance of sheets from the paper feeding unit 371 or 372 to the first transfer belt 311 and the second transfer belt 312 is referred to as paper feeding.

The printer 30 further includes a fixing device 330, a paper ejection guide 332, a paper ejection roller 340, and a paper ejection stack 350 above the second transfer belt 312.

The fixing device 330 is an example of a fixing device according to an embodiment of the present invention, and fixes the toner image on the sheet by applying heat to the sheet on which the toner image has been transferred. The fixing device 330 includes two fixing rollers 331a and 331b having outer peripheral surfaces face each other, and the fixing rollers 331a and 331b include fixing heaters 51 and 52, respectively. When the sheet passes between the fixing rollers 331a and 331b, the fixing rollers 331a and 331b have the sheet heated by the fixing heaters 51 and 52 and send the sheet after the heating to the paper ejection roller 340 through the paper ejection guide 332. The paper ejection roller 340 discharges, that is, ejects the sent sheet to the paper ejection stack 350.

The printer 30 can perform printing on both sides of a sheet. The operation of the printer 30 at the time of such double-sided printing will be described. First, when the printer 30 acquires data of two images to be printed on both sides of the sheet from the image reading device 22 or the like, the printer 30 forms a toner image of the image to be printed on one side of the sheet using the photoconductors 302 and the like. Specifically, the exposure device 320 including an LED light source (not illustrated) emits light to form images in the respective four colors of the toners of the toner image forming units 301a to 301d from the data of one image. The exposure device 320 emits four lights for forming the images in the four colors from the LED light source toward the four photoconductors 302 of the toner image forming units 301a to 301d.

For example, the emitted light passes through an optical component (not illustrated) and reaches the photoconductor 302 of the toner image forming unit 301a uniformly charged by the charging device 303, and forms the latent image corresponding to an image formed in magenta in the image, for example. Further, the latent image on the photoconductor 302 is visualized by the developing device 304, and the toner image with the magenta toner is formed and held on the surface of the photoconductor 302. The toner image is transferred by the first transfer roller 311a onto the surface of the first transfer belt 311 that moves in synchronization with the photoconductor 302. The first transfer belt 311 carries the toner image in magenta transferred on the surface, and moves in the counterclockwise arrow direction in FIG. 2.

Further, the latent image corresponding to an image formed in cyan is written on the photoconductor 302 of the toner image forming unit 301b, and the latent image is visualized into the toner image in cyan. This toner image is superimposed on the toner image in magenta already carried on the first transfer belt 311. Similar operation is performed in the toner image forming units 301c and 301d, and finally, the toner images in the four colors are superimposed on the first transfer belt 311. Note that, for example, in a case of forming a black and white image, a single-color monochrome black toner image may be formed.

Further, the second transfer belt 312 moves in the clockwise arrow direction in FIG. 2 in synchronization with the first transfer belt 311. Then, a toner image formed on the surface of the first transfer belt 311 and having the toner images in the four colors superimposed is transferred onto the surface of the second transfer belt 312 by the function of the second transfer roller 312a. The first transfer belt 311 and the second transfer belt 312 move while the toner images are formed on the respective photoconductors 302 of the four toner image forming units 301a to 301d by the so-called tandem system, and the formation of the toner images on the first transfer belt 311 and the second transfer belt 312 is performed. Therefore, formation time can be shortened.

When the first transfer belt 311 moves to a predetermined position, a toner image of an image to be printed on the other side of the sheet is formed by the photoconductor 302 and the like in a similar manner to the above description. At this time, the paper feeding to the first transfer belt 311 and the second transfer belt 312 is started. Specifically, the uppermost sheet in the paper feeding unit 371 or 372 is pulled out and conveyed to the registration roller 313.

The sheet passes through the registration roller 313 and is fed to between the first transfer belt 311 and the second transfer belt 312. The toner image on the surface of the first transfer belt 311 is transferred onto one side of the sheet by the second transfer roller 312a. Further, the sheet is conveyed upward, and the toner image on the surface of the second transfer belt 312 is transferred onto the other side of the sheet by a charger (not illustrated). In transfer, the sheet is conveyed with timing so that the position of the image is set to a normal position.

The sheet with the toner images transferred on both sides is sent to the fixing device 330. The fixing device 330 fuses the toner images on both sides of the sheet together and fixes the toner images on the sheet, and then conveys the sheet to the paper ejection roller 340 via the paper ejection guide 332. The paper ejection roller 340 ejects the fed sheet to the paper ejection stack 350.

In the case of single-sided printing, the toner image formed on the first transfer belt 311 is transferred onto the second transfer belt 312 and further transferred onto one side of the sheet. Alternatively, the toner image on the first transfer belt 311 is directly transferred onto one side of the sheet without being transferred onto the second transfer belt 312.

Further, the control device 40 will be described. The control device 40 controls the overall operation of the image forming apparatus 1. For example, the control device 40 controls power to be supplied to the fixing heaters 51 and 52 of the fixing device 330. Hereinafter, the configuration to control the power of the fixing heaters 51 and 52 in the control device 40 will be mainly described.

Figure 3:
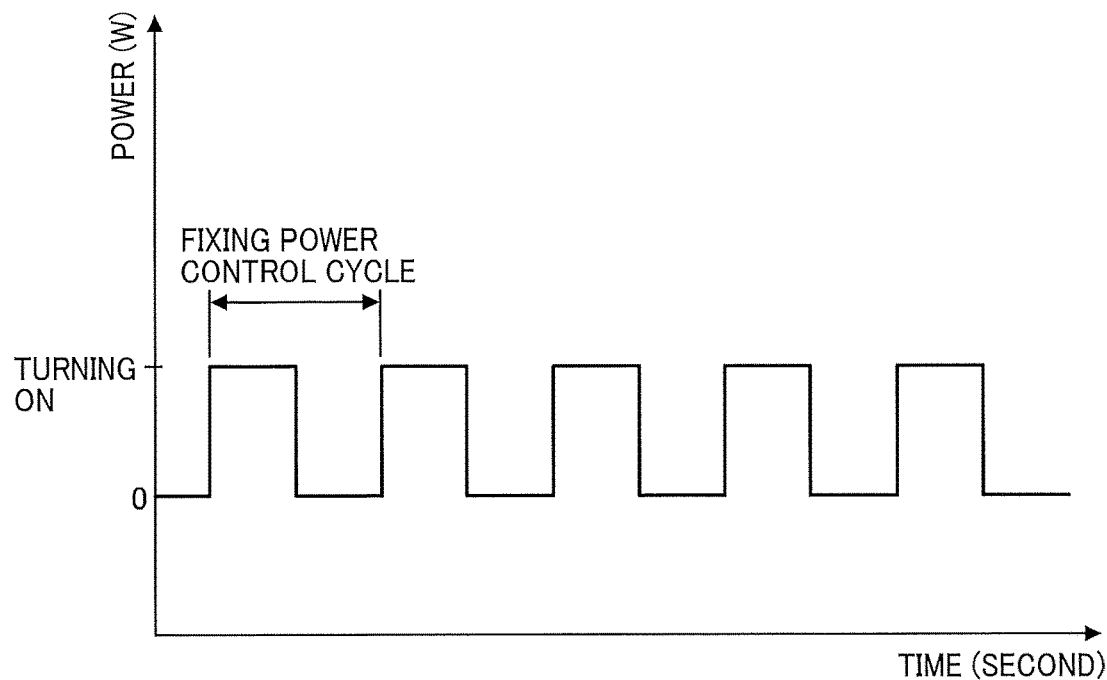
FIG. 3 is a graph illustrating an example of fixing power in the image forming apparatus according to the first embodiment.

In the present embodiment, the power to be supplied to the fixing heaters 51 and 52 (hereinafter also referred to as "fixing power") is pulse-wave power. For example, as illustrated in FIG. 3, the control device 40 turns ON or OFF power supply according to a control cycle to cyclically turn ON or OFF the fixing heaters 51 and 52. That is, the control device 40 performs duty control of the fixing power. FIG. 3 is a graph illustrating an example of the fixing power in the image forming apparatus 1 according to the first embodiment. The horizontal axis represents elapsed time (unit: second) and the vertical axis represents power (unit: W).

Thus, the control device 40 supplies the power having cyclicity to the fixing heaters 51 and 52. Note that the fixing power may be any power having cyclicity, and may be power that forms, for example, a triangular wave, a trapezoidal wave, a sine wave, or the like, in addition to a rectangular wave in FIG. 3. Furthermore, although alternating current (AC) power is used as the fixing power in the present embodiment, direct current (DC) power may be used.

Rated power is set to the image forming apparatus 1. The control device 40 distributes the power to the fixing heaters 51 and 52 and to the constituent elements of the image forming apparatus 1 other than the fixing heaters 51 and 52 within a range equal to or smaller than the rated power. In the present embodiment, the power consumed by the fixing heaters 51 and 52 is referred to as "primary-side power", and the power consumed by the constituent elements other than the fixing heaters 51 and 52 is referred to as "secondary-side power". For example, the secondary-side power is consumed by a scanner operation of the image reader 20, a printing operation of the printer 30, and operations of other peripheral devices. The primary-side power may include the power consumption of the constituent elements other than the fixing heaters 51 and 52. The primary-side power is alternating current (AC) power and the secondary-side power is DC power but the embodiment is not limited to this case. The control device 40 performs power control such that a sum of the primary-side power and the secondary-side power becomes equal to or smaller than the rated power.

Figure 4:
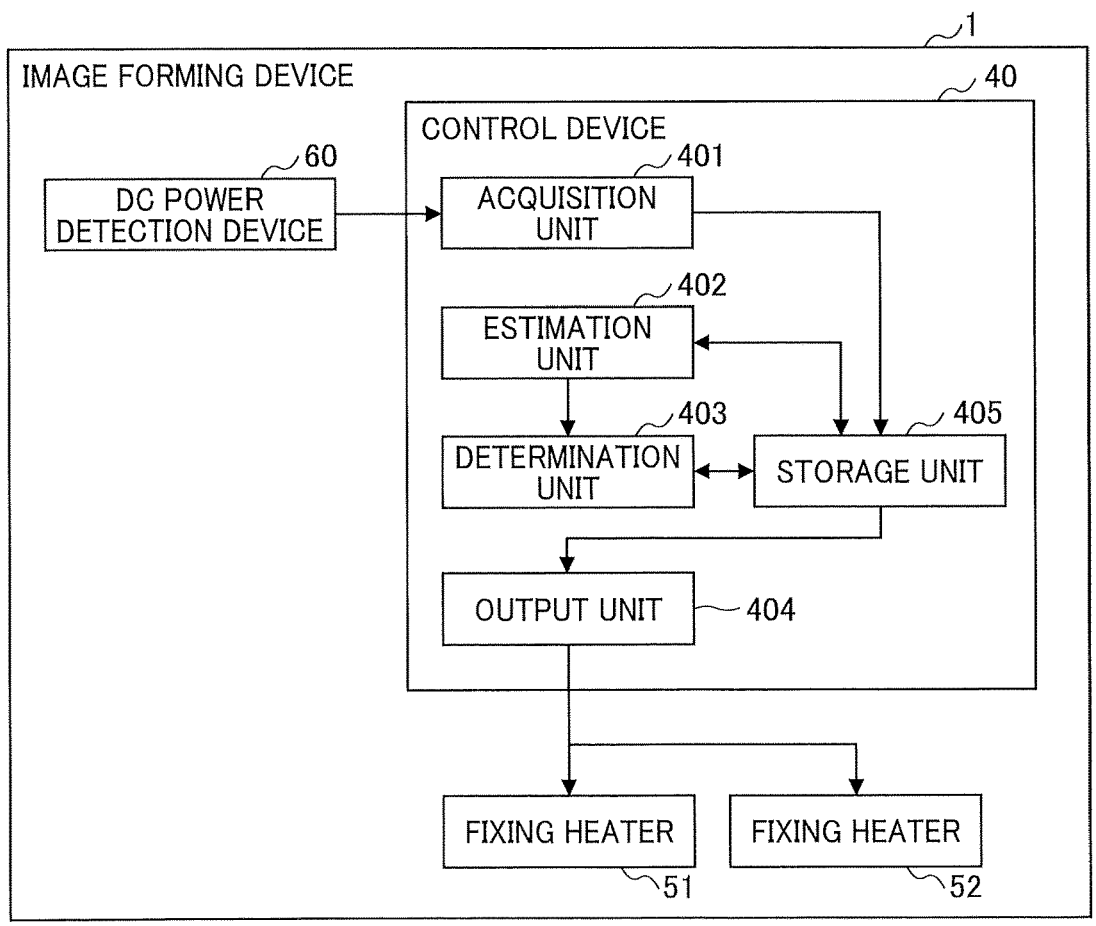
FIG. 4 is a block diagram illustrating an example of a functional configuration of the image forming apparatus according to the first embodiment.
Figure 5:
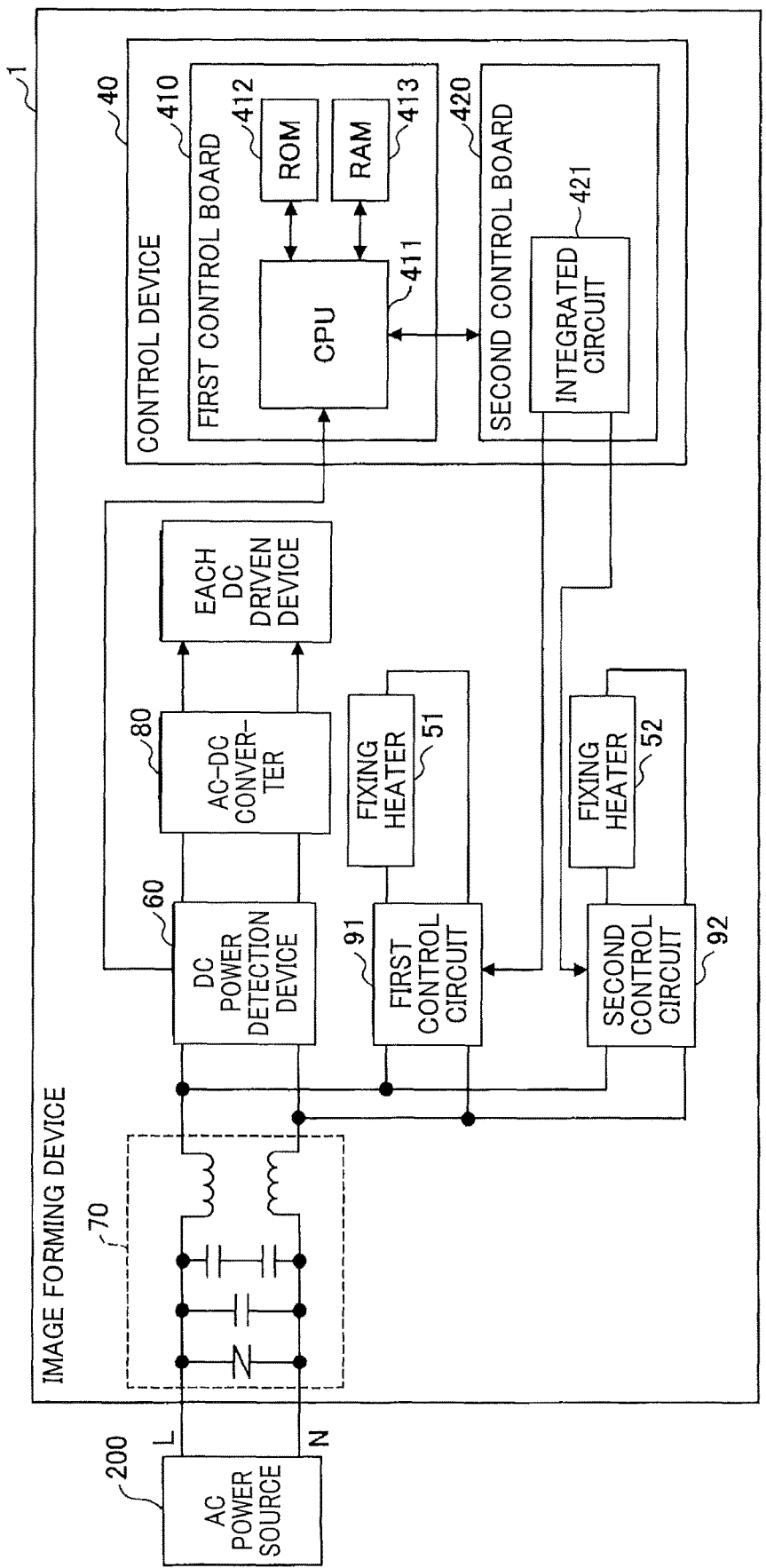
FIG. 5 is a block diagram illustrating an example of a hardware configuration of the image forming apparatus according to the first embodiment.

Details of the control device 40 will be described. FIG. 4 is a block diagram illustrating an example of a functional configuration of the image forming apparatus 1 according to the first embodiment. FIG. 5 is a block diagram illustrating an example of a hardware configuration of the image fondling apparatus 1 according to the first embodiment. First, the functional configuration of the control device 40 will be described.

As illustrated in FIG. 4, the control device 40 includes an acquisition unit 401, an estimation unit 402, a determination unit 403, an output unit 404, and a storage unit 405 as functional constituent elements. Further, the control device 40 is coupled to a direct current (DC) power detection device 60 and the fixing heaters 51 and 52 included in the image forming apparatus 1. The DC power detection device 60 is a device that detects the secondary-side power. The operation of the DC power detection device 60 may be controlled by the control device 40 or may be controlled by another control device included in the image forming apparatus 1.

The acquisition unit 401 acquires a secondary-side power value that is an example of a consumed DC power value that is a DC power value consumed in the image forming apparatus 1. Specifically, the acquisition unit 401 acquires, from the DC power detection device 60, time-series data of the secondary-side power value including the secondary-side power value detected by the DC power detection device 60 and a detection time of the secondary-side power value. The acquisition unit 401 causes the storage unit 405 to store the secondary-side power value of the time-series data and the detection time in association with each other.

The storage unit 405 can store various types of information and can take out the stored information. The storage unit 405 stores the time-series data of the secondary-side power value acquired by the acquisition unit 401, a limit value of the power of the fixing heaters 51 and 52 determined by the determination unit 403, and the like.

The estimation unit 402 estimates a characteristic of the secondary-side power value in a period in which the image forming apparatus 1 forms an image on at least one sheet, specifically, a variation characteristic. The estimation unit 402 outputs an estimation result to the determination unit 403.

Figure 6:
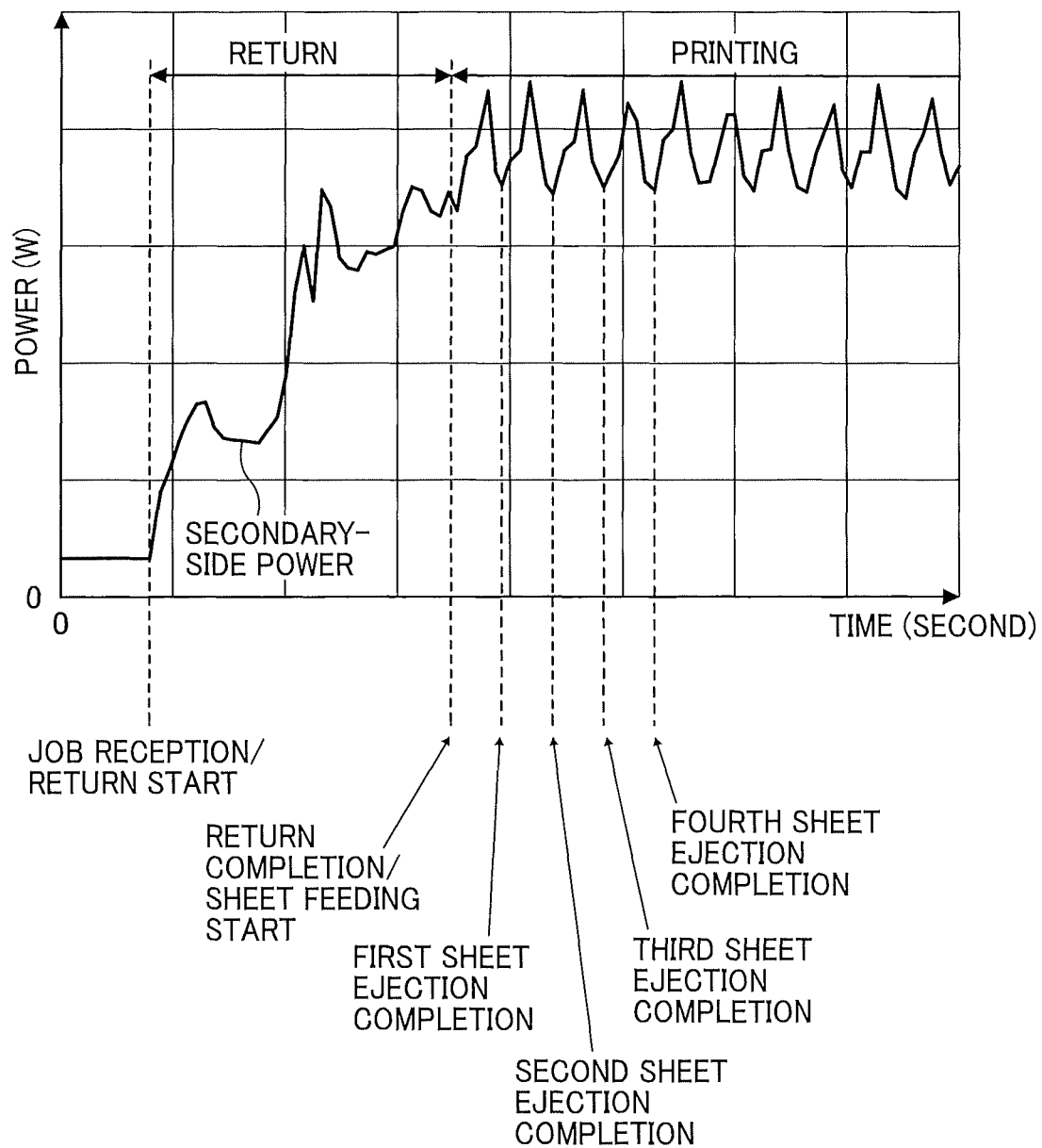
FIG. 6 is a graph illustrating an example of temporal change in direct current (DC) power at the time of printing in the image forming apparatus according to the first embodiment.

For example, FIG. 6 is a graph illustrating an example of temporal change in the DC power, that is, in the secondary-side power at the time of printing in the image forming apparatus 1 according to the first embodiment. In FIG. 6, the horizontal axis represents the elapsed time (unit: second), and the vertical axis represents the power (unit: W). The image forming apparatus 1 is in a standby state or a sleep state that is a state in which the functions are restricted to suppress the power consumption, in a non-operating state for at least one of acquisition of the image data and the formation of the image in the scanner function, the copying function, the printer function, or the facsimile function. For example, the image forming apparatus 1 in the standby state transitions to the sleep state when the above-described non-operating state continues for a predetermined time or more. Some image forming apparatuses 1 may transition to a deep sleep state when the above-described non-operating state continues for a predetermined time or more.

In the sleep state, the image forming apparatus 1 is in a state where the functions are more restricted than the standby state. In the deep sleep state, the image forming apparatus 1 is in a state where the functions are more restricted than the sleep state. The power consumption in the sleep state is smaller than the power consumption in the standby state, and the power consumption in the deep sleep state is smaller than the power consumption in the sleep state. The fixing heaters 51 and 52 can be operated in the standby state.

In the example in FIG. 6, the image forming apparatus 1 is in the sleep state when a print job has not been received yet. The print job is information including data to be printed and a command to execute printing. When the image forming apparatus 1 receives a print job giving an instruction for printing from the computer device 2, the PBX 3, the operation board 10, or the like, the image forming apparatus 1 starts return from the sleep state. Specifically, the image forming apparatus 1 transitions from the sleep state to the standby state, and after completion of the transition, the image forming apparatus 1 energizes the fixing heaters 51 and 52 to raise the temperature of the fixing rollers 331a and 331b of the fixing device 330. When the fixing rollers 331a and 331b rise to a target temperature, the return is completed. After completion of the return, the image forming apparatus 1 starts paper feeding and printing of the first sheet. In the example in FIG. 6, the print job includes a command to perform printing on a plurality of sheets, and the image forming apparatus 1 sequentially performs printing on the plurality of sheets. In a printing process of each sheet from the start of printing to the completion of discharge of sheets to the paper ejection stack 350, the waveform drawn by the secondary-side power value that changes over time is a mountain shape having a peak. The estimation unit 402 estimates the characteristic of such a waveform of the secondary-side power.

Figure 7:
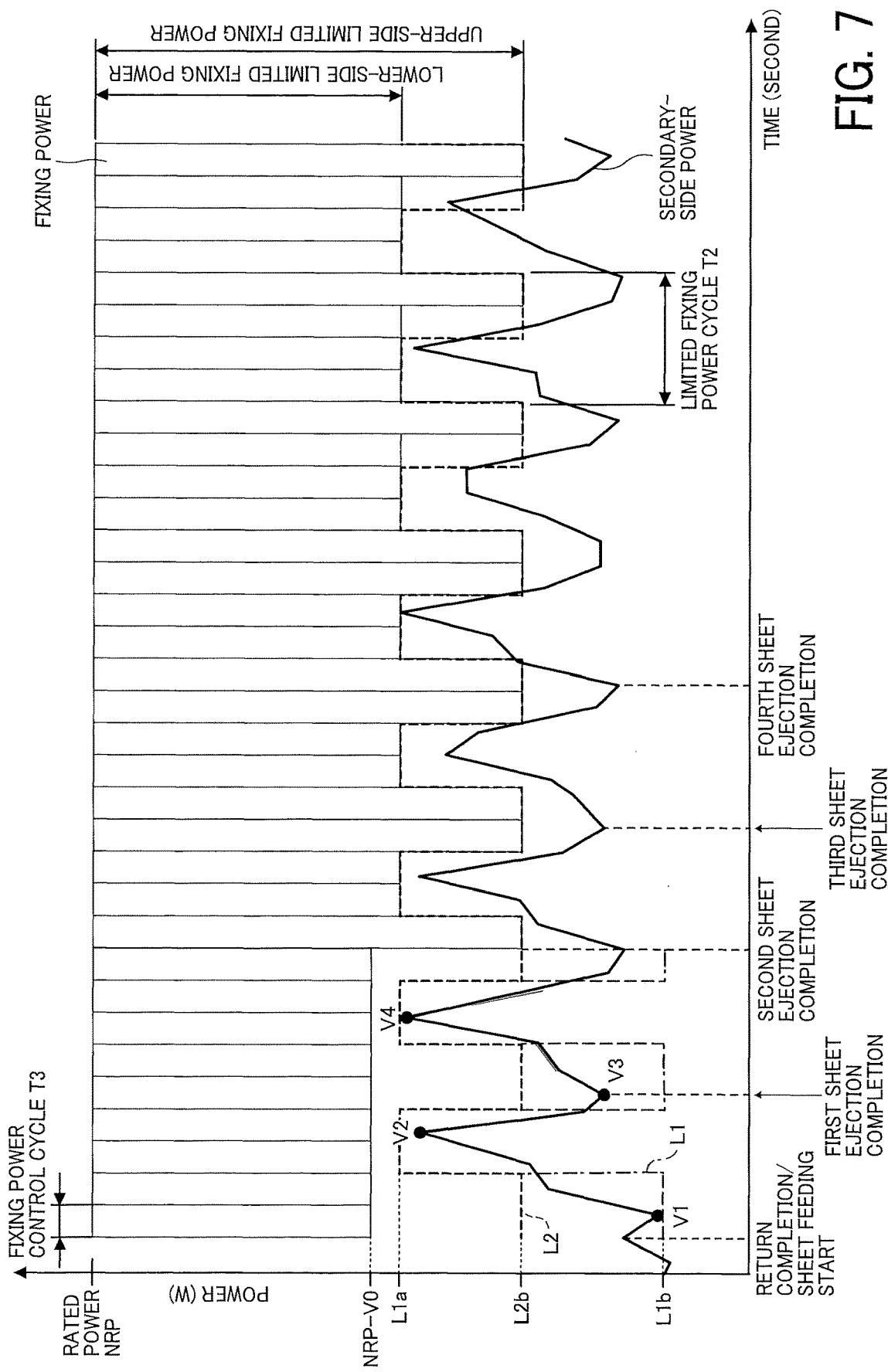
FIG. 7 is a graph illustrating an example of limited fixing power determined by the image forming apparatus according to the first embodiment.

FIG. 7 is a graph illustrating an example of limited fixing power determined by the image forming apparatus 1 according to the first embodiment, and is a partially enlarged graph of FIG. 6. As illustrated in FIG. 7, the estimation unit 402 extracts a maximum value and a minimum value and occurrence times of the maximum and minimum values of the waveform of the secondary-side power within the period in which an image is formed on at least one sheet, by reference to the storage unit 405. In the present embodiment, the above period is a period from the start time of printing and completion of image formation on at least two sheets to the completion of discharge of the at least two sheets, and is specifically the period to the completion of discharge of the second sheet. The start time of printing is also the start time of paper feeding.

In the example in FIG. 7, the estimation unit 402 extracts two maximum values and two minimum values and times when the values are detected, in the waveform of the secondary-side power (hereinafter also referred to as "target power waveform") in the period from the start time of printing to the completion of discharge of the second sheet. Specifically, the estimation unit 402 extracts one maximum value and one minimum value in each of a period from the start time of printing to the completion time of discharge of the first sheet and a period from the completion time of discharge of the first sheet to the completion time of discharge of the second sheet. That is, the estimation unit 402 extracts one maximum value and one minimum value for each peak of the target power waveform. In the present embodiment, the estimation unit 402 extracts power values at local maximum points V2 and V4 and local minimum points V1 and V3 of the target power waveform as the maximum and minimum values, respectively. However, the estimation unit 402 may extract mere maximum values and minimum values.

Furthermore, the estimation unit 402 estimates an amplitude A1 and a cycle T1 of the waveform of the secondary-side power as characteristics of the secondary-side power from the two maximum values, the two minimum values, and the detection times. The estimation of the amplitude and the cycle may be performed by any known method. For example, the amplitude and the cycle may be estimated by pattern matching of the local maximum points V2 and V4 and the local minimum points V1 and V3 with a waveform having cyclicity such as a sine wave or a rectangular wave. Alternatively, the amplitude and the cycle may be estimated by averaging an amplitude and a cycle estimated from the local maximum point V2 and the local minimum point V1 and an amplitude and a cycle estimated from the local maximum point V4 and the local minimum point V3. Alternatively, the amplitude and the cycle may be estimated from the local maximum point V4 having the largest power value and the local minimum point V1 having the smallest power value.

The determination unit 403 determines the limit value of the fixing power (hereinafter also referred to as "limited fixing power value") to be supplied to the fixing heaters 51 and 52 to have cyclicity corresponding to the estimated characteristics of the secondary-side power on the basis of the estimated characteristics of the secondary-side power. Specifically, the determination unit 403 determines an amplitude A2 and a cycle T2 of the limited fixing power value corresponding to the amplitude A1 and the cycle T1 of the secondary-side power.

Here, assuming that the control cycle of the fixing power is T3, the determination unit 403 determines the cycle T2 such that the cycle T2 is near the cycle T1 and is equal to or longer than the cycle T3. Furthermore, the determination unit 403 determines the cycle T2 such that the cycle T2 is an integral multiple of the cycle T3. In the example in FIG. 7, the determination unit 403 determines a cycle that is four times the cycle T3 as the cycle T2.

Further, the determination unit 403 calculates a rectangular-wave shaped power waveform L1 (displayed by an alternate long and short dash line in FIG. 7) having an amplitude A4 near the amplitude A1 and equal to or larger than the amplitude A1, and the cycle T2. A local maximum value L1$a$ of the power waveform L1 is equal to or larger than the power values of the local maximum points V2 and V4, and a local minimum value L1$b$ of the power waveform L1 is equal to or smaller than the power values of the local minimum points V1 and V3. The shape of the power waveform L1 conforms to the shape of the target power waveform. That is, positions of ridges and troughs of the power waveform L1 correspond to positions of ridges and troughs of the target power waveform, respectively.

Furthermore, the determination unit 403 calculates a power waveform L2 (displayed by a broken line in FIG. 7) obtained by changing the local minimum value L1$b$ in the power waveform L1. The power waveform L2 has the same cycle T2 and local maximum value L1$a$ as the power waveform L1, and has a local minimum value L2$b$ larger than local minimum value L1$b$ of the power waveform L1. The determination unit 403 determines the local minimum value L2$b$ to be a value smaller than the local maximum value L1$a$ and which prevents the power waveform L2 from intersecting with the target power waveform. The power waveform L2 may be in contact with the target power waveform or may be spaced apart from the target power waveform but the power waveform L2 does not intersect with the target power waveform.

Further, the determination unit 403 calculates a waveform of limited fixing power, using the power waveform L2 and a waveform of the rated power of the image forming apparatus 1. The waveform of the rated power is a linear waveform with a constant rated power value NRP regardless of passage of time. The determination unit 403 determines a power waveform obtained by subtracting the power waveform L2 from the waveform of the rated power as a waveform of the limited fixing power (hereinafter also referred to as "limited power waveform"). That is, (the limited power waveform)=(the rated power waveform)−(the power waveform L2).

Such a limited power waveform is in a complementary relationship with the power waveform L2 of the secondary-side power, and positions of ridges and troughs of the limited power waveform correspond to positions of ridges and troughs of the power waveform L2, respectively. For example, the shape of the limited power waveform may be the same as the waveform of the power waveform L2 with a shifted phase by ½ cycle. In FIG. 7, the shape of the limited power waveform is a rectangular wave, which is the same as a waveform obtained by inverting the power waveform L2 in an amplitude direction. Therefore, the distance between the rated power waveform and the power waveform L2 indicates the limited fixing power. The shape of the limited power waveform may be another shape such as a triangular wave, a trapezoidal wave, or a sine wave.

The cycle of such a limited power waveform is the cycle T2, which is T3×4, which is the same as the cycle of the power waveform L2. The local maximum value of the limited power waveform is NRP−L2$b$, and the local minimum value of the limited power waveform is NRP−L1$a$. The amplitude of the limited power waveform is the amplitude A2, specifically, (L1$a$−L2$b$)/2.

The determination unit 403 causes the storage unit 405 to store information of the calculated limited power waveform. That is, the determination unit 403 causes the storage unit 405 to store the amplitude A2 (=(L1$a$−L2$b$)/2), the cycle T2 (=T3×4), the local maximum value (NRP−L2$b$), the local minimum value (NRP−L1$a$), and the times of the local maximum value and the local minimum value in the cycle T2 in association with one another. Note that, in FIG. 7, the times of the local maximum value and the local minimum value are T3×2. An upper-side limited fixing power in FIG. 7 corresponds to the local maximum value, and a lower-side limited fixing power corresponds to the local minimum value.

The output unit 404 outputs a control signal of the fixing power to the fixing heaters 51 and 52. Specifically, the output unit 404 outputs the control signal of the fixing power not greater than the limited fixing power according to the limited fixing power preset and stored in the storage unit 405 in a period from the start time of printing to the completion of discharge of the second sheet. The period from the start time of printing to the completion of discharge of the second sheet is the target period for which the estimation unit 402 estimates the characteristics of the secondary-side power value. For example, a limited fixing power value V0 that is constant regardless of the passage of time may be set in advance. Such a limited fixing power value V0 can be equal to or smaller than the local minimum value (NRP−L1$a$). Note that the output unit 404 may start the fixing heaters 51 and 52 for raising the temperature of the fixing device 330 before the start time of printing after the image forming apparatus 1 enters the standby state. In this case, the output unit 404 may perform power control according to the above preset limited fixing power.

The output unit 404 outputs the control signal of the fixing power not greater than the limited fixing power according to the limited fixing power determined by the determination unit 403 and stored in the storage unit 405 after the completion of discharge of the second sheet. For example, as illustrated in FIG. 7, the output unit 404 outputs the control signal of the fixing power not greater than an upper-side limited fixing power value or a lower-side limited fixing power value according to the limited power waveform.

As described above, the shape of the limited power waveform is a shape complementary to the waveform of the secondary-side power. Therefore, the limited fixing power can be made as large as possible while maintaining the sum of the limited fixing power and the secondary-side power to be equal to or smaller than the rated power. In other words, reduction of power not used for the limited fixing power and the secondary-side power is possible within the rated power. In particular, application of the upper-side limited fixing power to the limited fixing power greatly contributes to the increase in the limited fixing power.

Furthermore, the output unit 404 acquires the detection value of the secondary-side power via the acquisition unit 401 in real time, and controls the fixing power such that the sum of the secondary-side power value and the fixing power value does not exceed the rated power value. For example, in FIG. 7, when the upper-side limited fixing power is applied after the completion of discharge of the fourth sheet, the sum of the secondary-side power value and the limited fixing power value exceeds the rated power value in some cases. For example, the intersection of the power waveform L2 and the waveform of the secondary-side power corresponds to the excess. In such a case, the output unit 404 avoids the excess by temporarily changing the upper limit of the fixing power value from the upper-side limited fixing power value to the lower-side limited fixing power value in units of the cycle T3, for example.

Next, a hardware configuration of the control device 40 will be described. As illustrated in FIG. 5, the control device 40 includes a first control board 410 and a second control board 420 as hardware constituent elements. The first control board 410 is a circuit board that controls the operation of each device of the image forming apparatus 1, and the second control board 420 is a circuit board that controls power supply to the fixing heaters 51 and 52.

The first control board 410 includes a central processing unit (CPU) 411 that is a processor or the like, a read only memory (ROM) 412 that is a non-volatile semiconductor memory device or the like, and a random access memory (RAM) 413 that is a volatile semiconductor memory device or the like. A program for operating the control device 40 is stored in advance in the ROM 412. The program is read by the CPU 411 from the ROM 412 to the RAM 413 and expanded. The CPU 411 executes each coded command in the program expanded in the RAM 413. The storage of the program is not limited to the ROM 412, and may be a recording medium such as a recording disk, for example. Further, the program may be transmitted via a wired network, a wireless network, broadcast, or the like and taken in the RAM 413. The control device 40 may include another storage device such as a hard disk.

The CPU 411 is coupled to the DC power detection device 60, acquires a detection result of the secondary-side power from the DC power detection device 60, and stores the detection result in the ROM 412. The CPU 411 may control the detection operation of the DC power detection device 60. Further, the CPU 411 determines the limited fixing power of the fixing heaters 51 and 52 on the basis of the detection result of the DC power detection device 60 and causes the ROM 412 to store the limited fixing power. The CPU 411 outputs a command to limit the fixing power on the basis of the limited fixing power to the second control board 420. The CPU 411 may include a timer that measures time and output a command at an appropriate timing based on the time.

The second control board 420 includes an integrated circuit 421. The integrated circuit 421 outputs, to each of a first control circuit 91 and a second control circuit 92, a control signal for supplying the fixing power not greater than the limited fixing power to the fixing heaters 51 and 52, according to the command acquired from the CPU 411. The first control circuit 91 and the second control circuit 92 receive power supply from a power source 200 and supply drive power corresponding to the control signal to the fixing heaters 51 and 52. In the present embodiment, the power source 200 is, but not limited to, a commercial AC power source.

The AC power of the power source 200 passes through a filter circuit 70 of the image forming apparatus 1 to undergo noise removal, and is then supplied to an alternating current-direct current (AC-DC) converter 80, the first control circuit 91, and the second control circuit 92. The AC-DC converter 80 converts AC power into DC power, and supplies the converted DC power as the secondary-side power to each device driven by the DC power in the image knitting apparatus 1. An example of the AC-DC converter 80 is an AC-DC conversion circuit.

The DC power detection device 60 includes a DC current detection device and a voltage detection device. The DC current detection device and the voltage detection device may be configured by circuits or elements. The DC current detection device detects a DC current value of the secondary-side power system of the image forming apparatus 1. For example, the DC current detection device may be disposed on a primary-side circuit on the side of the power source 200 with respect to the AC-DC converter 80, and detect the DC current value of the secondary-side power system by calculation or the like by the primary-side circuit detecting a current. At this time, for example, the DC current detection device may detect a current value in the AC-DC converter 80. Alternatively, the DC current detection device may be disposed on a secondary-side circuit on the side of a device driven by the DC power with respect to the AC-DC converter 80, and detect the DC current value.

The voltage detection device may detect any voltage value of the primary-side power system and the secondary-side power system of the image forming apparatus 1. For example, the voltage detection device may detect the voltage value of the secondary-side power system in the AC-DC converter 80, and detect the voltage value of the primary-side power system in a circuit to which the fixing heaters 51 and 52 are connected. The DC power detection device 60 can detect the DC power from the rated power of the image forming apparatus 1 and the detection results of the DC current detection device and the voltage detection device.

For example, the acquisition unit 401, the estimation unit 402, and the determination unit 403 of the control device 40 are implemented by the CPU 411 and the like, and the output unit 404 is implemented by the CPU 411, the integrated circuit 421, and the like. The storage unit 405 is implemented by the ROM 412, the RAM 413, and the like.

Note that the constituent elements of the acquisition unit 401, the estimation unit 402, the determination unit 403, and the output unit 404 may be implemented by a program execution unit such as the CPU 411 or the like, may be implemented by a circuit, or may be implemented by a combination of the program execution unit and the circuit. For example, these constituent elements may be implemented as a large scale integration (LSI) as an integrated circuit. These constituent elements may be individually made into one chips or may be made into one chip so as to include part or all. As the LSI, a field programmable gate array (FPGA) that can be programmed after LSI manufacturing, a reconfigurable processor that can reconfigure at least one of connection and setting of circuit cells inside the LSI, an application specific integrated circuit (ASIC) in which circuits of a plurality of functions are combined into one for a specific application, or the like may be used. The storage unit 405 may be implemented as a storage device such as a hard disk or a solid state drive (SSD).

<Operation of Image Forming Apparatus 1>

Figure 8:
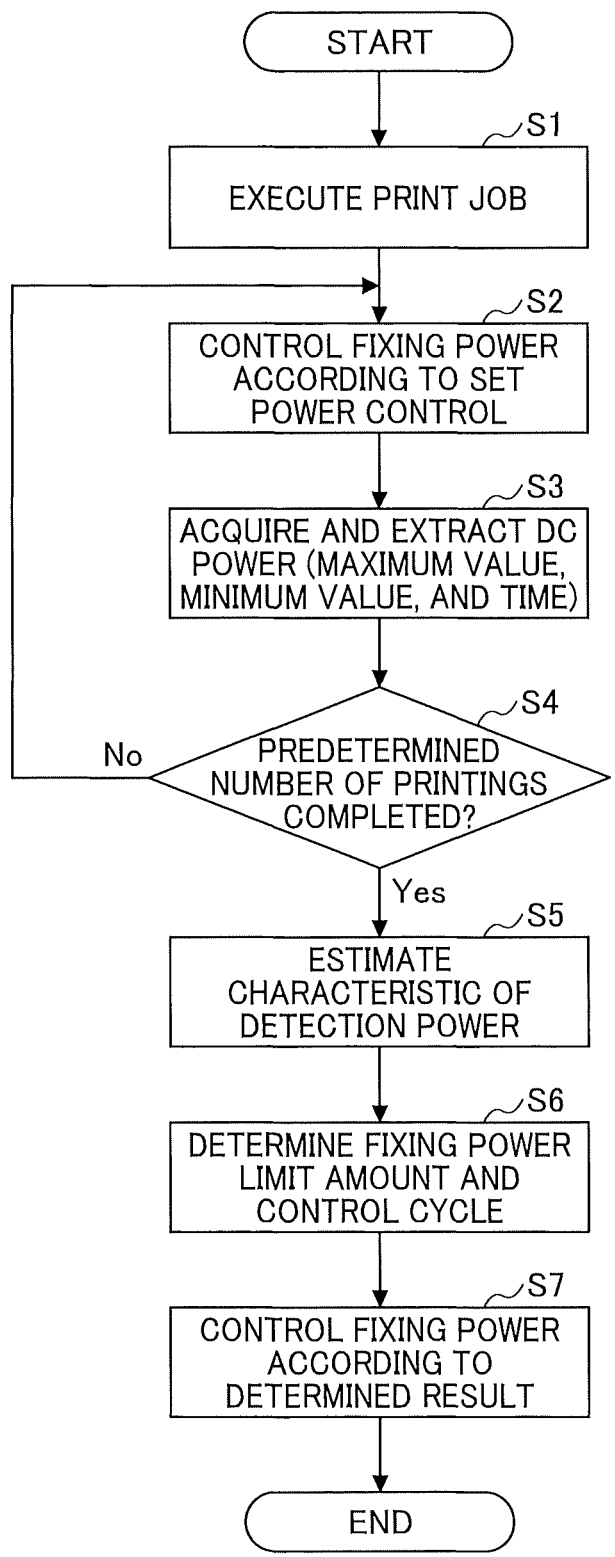
FIG. 8 is a flowchart illustrating an example of an operation of the image forming apparatus according to the first embodiment.

The operation of the image forming apparatus 1 according to the first embodiment will be described. FIG. 8 is a flowchart illustrating an example of the operation of the image forming apparatus 1 according to the first embodiment. As illustrated in FIG. 8, first, when receiving a print job, the control device 40 causes the image forming apparatus 1 to transition to the standby state, activates the fixing heaters 51 and 52, and then starts execution of the print job. That is, the control device 40 starts paper feeding and printing of the first sheet (step S1).

Next, the control device 40 controls the fixing power of the fixing heaters 51 and 52 according to the power control based on the constant limited fixing power value V0 preset and stored in the storage unit 405 in the process of printing (step S2).

Furthermore, the control device 40 acquires the detection value and the detection time of the secondary-side power from the DC power detection device 60, for example, in real time. Then, the control device 40 extracts the local maximum values and the local minimum values and the detection times of the local maximum and minimum values of the power at the peaks and the periphery of the peaks of the power waveform as the maximum values and the minimum values and the times of the maximum and minimum values from the time-series data of the secondary-side power value (step S3).

Next, the control device 40 determines whether printing of a predetermined number of sheets has been completed (step S4). In the present embodiment, the predetermined number is "2", and the completion of printing means the completion of paper ejection. The control device 40 proceeds to step S5 in a case of completion (Yes in step S4), and returns to step S2 in a case of incompletion (No in step S4).

In step S5, the control device 40 estimates the characteristics of the secondary-side power detected until the completion of printing of the predetermined number of sheets on the basis of the local maximum values and the local minimum values and the detection times of the local maximum and minimum values. Specifically, the control device 40 estimates the amplitude and the cycle of the waveform of the secondary-side power.

Next, the control device 40 determines a limit amount and the control cycle of the fixing power of the fixing heaters 51 and 52 on the basis of the amplitude and the cycle of the waveform of the secondary-side power and the rated power of the image forming apparatus 1 (step S6). Specifically, the control device 40 calculates the limited power waveform of the fixing power, and determines the limited fixing power value and the cycle indicated by the limited power waveform as the limit amount and the control cycle of the fixing power.

Next, the control device 40 outputs the control signal of the fixing power according to the limit amount and the control cycle of the fixing power, which are the determination results, to the fixing heaters 51 and 52, thereby controlling the fixing power of the fixing heaters 51 and 52 (step S7).

In the present embodiment, the control device 40 receives a new print job and performs the processing of steps S1 to S7 each time newly starting printing. Note that the processing frequency of steps S1 to S7 is not limited to the above-described frequency, and may be a cycle such as each predetermined times of printing that is twice or more or may be a predetermined cycle such as each predetermined time. In these cases, the control device 40 may hold the limit amount and the control cycle of the fixing power determined in steps S1 to S7, and use the held limit amount and control cycle at the time of printing when the processing of steps S1 to S7 is not performed.

EXAMPLE

Results of comparison of states of fixing temperatures that are temperatures of the fixing rollers of the fixing device between a case of continuously performing printing on a plurality of sheets by the image forming apparatus 1 of an example of the first embodiment, and a case of continuously performing printing on a plurality of sheets by an image forming apparatus of a comparative example will be described.

The image forming apparatus 1 according to the example raises the fixing rollers 331a and 331b to a target temperature by the fixing heaters 51 and 52 by the start time of paper feeding of the first sheet, and controls the fixing power so as not to exceed the preset constant limited fixing power value after the temperature rise to the completion of paper ejection of the second sheet. After that, the image forming apparatus 1 controls the fixing power so as not to exceed the limited fixing power value having cyclicity calculated from the detection result of the secondary-side power up to the completion of paper ejection of the second sheet.

The image forming apparatus of the comparative example raises fixing rollers to the target temperature by fixing heaters by the start time of paper feeding of the first sheet, and controls the fixing power so as not to exceed a constant limited fixing power value after the temperature rise. Since such a limited fixing power value is set with a margin so that the sum of the limited fixing power value and a secondary-side power value does not exceed the rated power of the image forming apparatus, the limited fixing power value becomes equal to or smaller than the local minimum value (NRP−L1a) of the limited power waveform in the example.

Figure 9A:
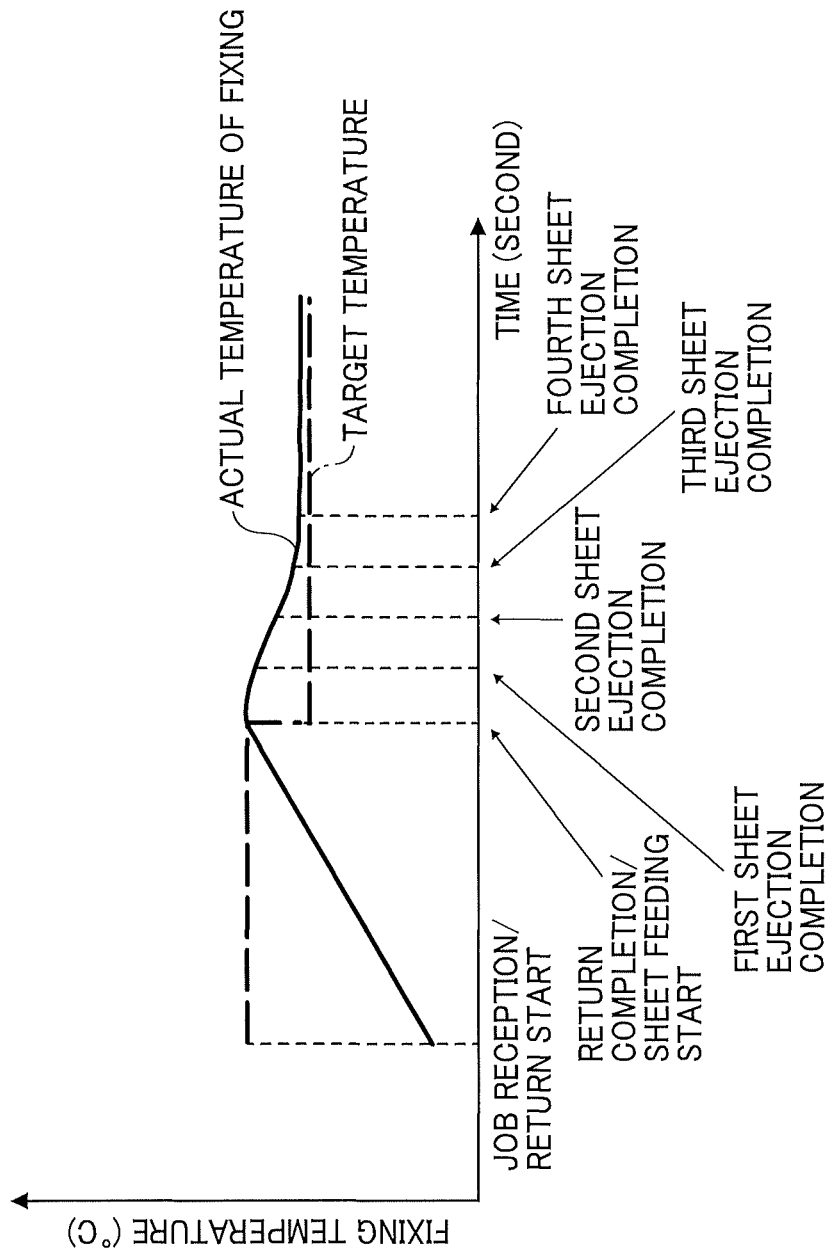
FIG. 9A is a graph illustrating an example of temporal change in fixing temperature at the time of printing in an example of the image forming apparatus according to the first embodiment.
Figure 9B:
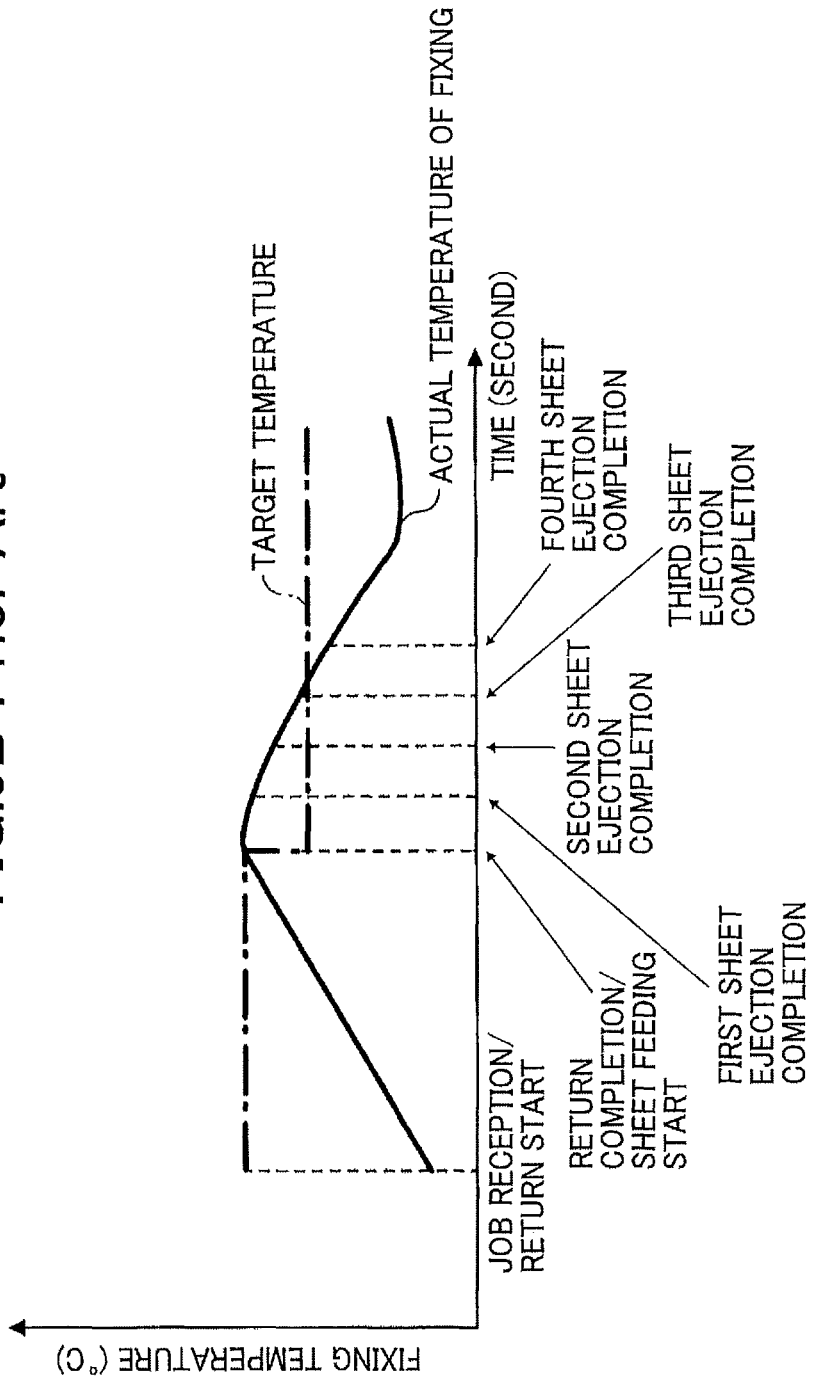
FIG. 9B is a graph illustrating an example of temporal change in fixing temperature at the time of printing in the image forming apparatus according to a comparative example.

FIG. 9A is a graph illustrating an example of temporal change in fixing temperature at the time of printing in the example of the image forming apparatus 1 according to the first embodiment. FIG. 9B is a graph illustrating an example of temporal change in fixing temperature at the time of printing in the image forming apparatus according to the comparative example. In FIGS. 9A and 9B, the horizontal axis represents the elapsed time (unit: second) and the vertical axis represents the fixing temperature (unit: ☐).

As illustrated in FIG. 9B, in the comparative example, an actual temperature of fixing, which is an actual temperature of the fixing rollers, continues to descend immediately after the start of paper feeding because the heat of the fixing rollers is absorbed by the sheet, and falls below the target temperature on and after the completion of paper ejection of the third sheet. Therefore, there is a possibility of incompletion of fixing on the sheet, and thus printing speed needs to be decreased.

Meanwhile, as illustrated in FIG. 9A, in the example, the actual temperature of fixing descends from the start of paper feeding to the completion of paper ejection of the second sheet but stops descending on and after the completion of paper ejection of the second sheet where the control of the fixing power is changed, and maintains a substantially constant temperature that is equal to or higher than the target temperature. Thereby, fixing on the sheet is favorable and stable. This is because the fixing power as large as possible is secured in accordance with the variation of the secondary-side power.

Furthermore, as the comparative example of the image forming apparatus, there is one that does not instantly perform paper feeding even if the temperature of the fixing rollers reaches the target temperature in order to suppress the decrease in the fixing temperature, and performs the paper feeding after heat storage in the fixing rollers is performed for a fixed time. In this image forming apparatus, the time required to complete the paper ejection of the first sheet tends to be long. Meanwhile, the image forming apparatus 1 of the example can maintain the fixing temperature to the target temperature or higher during printing on the plurality of sheets while shortening the time to the completion of paper ejection of the first sheet.

<Effects and the Like>

As described above, the control device 40 according to the first embodiment is a control device of the image forming apparatus 1 that forms an image on a sheet as a recording medium. The control device 40 includes the acquisition unit 401 that acquires the secondary-side power value as the consumed DC power value consumed in the image forming apparatus 1, the estimation unit 402 that estimates the characteristics of the secondary-side power value in the period in which an image is formed on at least one sheet, and the determination unit 403 that determines the limit value of the fixing power to be supplied to the fixing device 330 as a fixing device of the image forming apparatus 1 that fixes the image on the sheet, to have cyclicity corresponding to the characteristics of the secondary-side power value. Further, the image forming apparatus 1 according to the first embodiment includes the control device 40 as described above.

According to the configuration, the control device 40 determines the limit value of the fixing power to have the cyclicity corresponding to the characteristics of the secondary-side power value, rather than to have a constant value. Such a limit value of the fixing power can be determined to cyclically change in accordance with increase/decrease in the secondary-side power value. For example, generally, the rated power is set to the image forming apparatus 1, and all the constituent elements of the image forming apparatus 1 can consume the power distributed within the rated power. The limit value of the fixing power that changes in accordance with the increase/decrease in the secondary-side power value can be made large in the distribution amount within the rated power. Therefore, usable power of fixing heaters 51 and 52 can be increased.

Further, in the control device 40 according to the first embodiment, the estimation unit 402 may estimate the amplitude and the cycle of the secondary-side power value in the period in which an image is formed on at least one sheet, and the determination unit 403 may determine the amplitude and the cycle of the limit value of the fixing power corresponding to the amplitude and the cycle of the secondary-side power value. According to the above configuration, the processing for determining the limit value of the fixing power becomes simplified. Furthermore, for example, the power waveform of the limit value of the fixing power can be determined to be complementary to the power waveform of the secondary-side power value within the rated power of the image forming apparatus 1. Therefore, the limit value of the fixing power can be increased.

Further, in the control device 40 according to the first embodiment, the fixing power has the cyclicity, and one cycle of the limit value of the fixing power may be an integral multiple of the cycle of the fixing power. According to the above configuration, the control device 40 can determine the fixing power having an integral number of cycles included in one cycle of the limit value of the fixing power as the upper limit value. At this time, the magnitude of the fixing power can be adjusted without changing the cycle of the fixing power. Therefore, the processing for adjusting the fixing power in accordance with the limit value becomes simplified.

Further, in the control device 40 according to the first embodiment, the estimation unit 402 may estimate the characteristics of the secondary-side power value in a period in which an image is formed on at least two sheets. According to the above configuration, the target period for which the estimation unit 402 estimates the characteristics of the secondary-side power value becomes long, and thus the estimation accuracy can be improved.

Further, in the control device 40 according to the first embodiment, the determination unit 403 may determine the limit value of the fixing power in a target period for which the estimation unit 402 estimates the characteristics of the secondary-side power value, as the preset limit value. According to the above configuration, the control device 40 can supply the fixing power controlled according to the limit value to the fixing heaters 51 and 52 even in the target period in which the characteristics of the secondary-side power value are estimated. Therefore, the control device 40 can perform formation of the image on the sheet without a delay.

Second Embodiment

The control device 40 according to the first embodiment controls the fixing power such that the sum of the secondary-side power and the fixing power does not exceed the rated power after determination of the limited fixing power based on the secondary-side power during continuous printing of the plurality of sheets. A control device according to a second embodiment is different from the first embodiment in determining new limited fixing power when a sum of secondary-side power and limited fixing power exceeds rated power during continuous printing of a plurality of sheets. Hereinafter, different points of the second embodiment from the first embodiment will be mainly described, and description of similar points to the first embodiment is omitted as appropriate.

Figure 10:
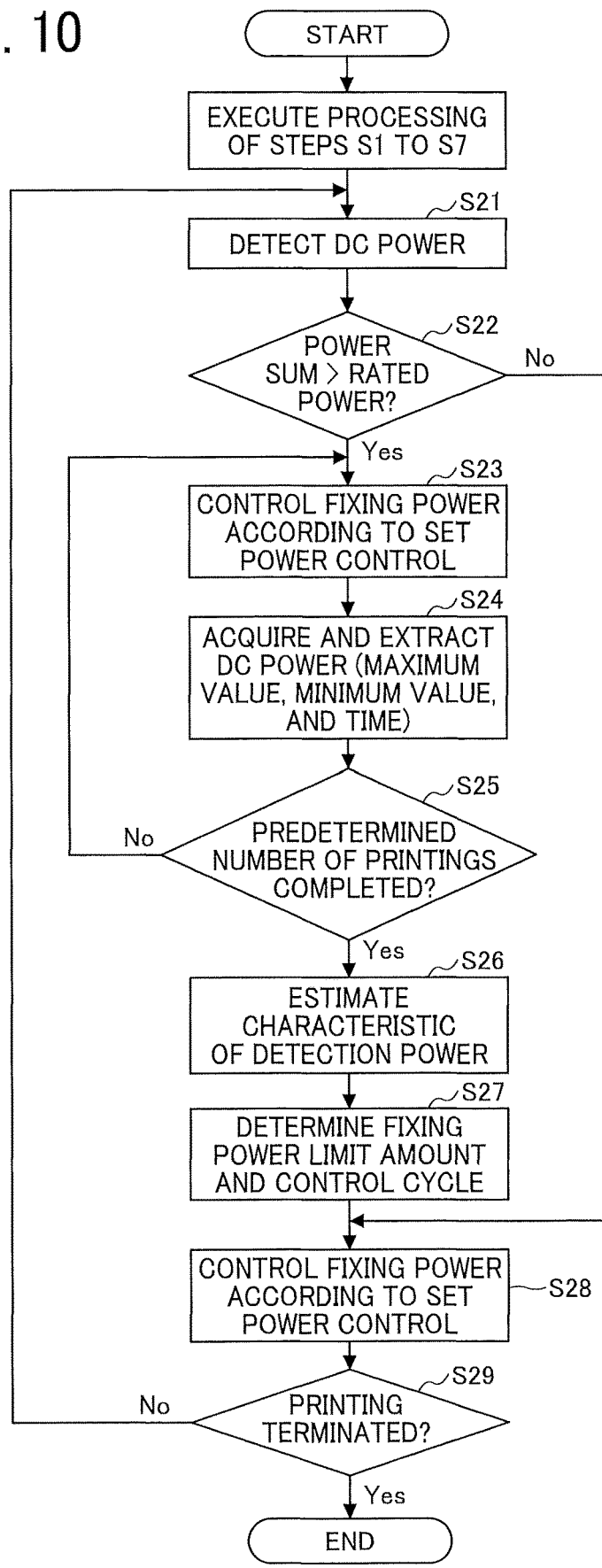
FIG. 10 is a flowchart illustrating an example of an operation of an image forming apparatus according to a second embodiment.

Configurations of an image forming apparatus and a control device according to the second embodiment are similar to the configuration of the first embodiment. For this reason, reference numerals of the image forming apparatus and the control device, and constituent elements of the image forming apparatus and the control device according to the second embodiment are set to the same as the reference numerals of the first embodiment. Hereinafter, description of the configurations of an image forming apparatus 1 and a control device 40 according to the second embodiment is omitted, and an operation of the control device 40 will be described. FIG. 10 is a flowchart illustrating an example of the operation of the image forming apparatus 1 according to the second embodiment. FIG. 10 illustrates a case of continuously performing printing on a plurality of sheets. As illustrated in FIG. 10, the control device 40 according to the second embodiment performs processing of steps S1 to S7, similarly to the first embodiment, and then further performs processing of steps S21 to S29 followed by the processing of step S7.

In step S21, the control device 40 acquires a detection value and a detection time of secondary-side power from a DC power detection device 60 in real time during continuous printing on the plurality of sheets.

Next, in step S22, the control device 40 determines whether a sum of the detection value of the secondary-side power and a limited fixing power value at the same time exceeds rated power of the image forming apparatus 1 (step S22). The control device 40 proceeds to step S23 in a case where the sum exceeds the rated power (Yes in step S22), and returns to step S28 in a case where the sum does not exceed the rated power (No in step S22).

In step S23, the control device 40 controls the fixing power of the fixing heaters 51 and 52 in accordance with power control based on the currently set limited fixing power.

Then, the control device 40 performs processing of step S24 to S27 similar to steps S3 to S6 in the first embodiment, thereby calculating a limit amount and a control cycle of the fixing power of the fixing heaters 51 and 52 on the basis of the detection result of the secondary-side power from the excess time to completion of printing on the predetermined number of sheets and determining the calculated limit amount and control cycle as a limit amount and a control cycle of new fixing power. Note that the predetermined number in step S25 is the same as the predetermined number in step S4. However, the predetermined number may be different. Further, the detection value of the secondary-side power used for the calculation of the limit amount and the control cycle of the fixing power may be a detection value of a period from a time before or after the excess time to the completion of printing on the predetermined number of sheets. Thereby, an output timing of the calculation result can be adjusted.

Further, in step S28, the control device 40 controls the fixing power of the fixing heaters 51 and 52 in accordance with power control based on currently set limited fixing power.

Next, in step S29, the control device 40 determines whether the printing of a planned number of sheets has been completed, that is, whether the printing has been completed. The control device 40 terminates the series of processing in a case where the printing has been completed (Yes in step S29), and returns to step S21 in a case where the printing has not been completed (No in step S29).

According to the above-described control device 40 of the second embodiment, similar effect to the effects of the first embodiment can be obtained. Furthermore, the control device 40 according to the second embodiment may newly estimate characteristics of the secondary-side power value in a period in which an image is formed on at least one sheet in a case where the sum of the secondary-side power value and the limit value of the fixing power exceeds the rated power of the image forming apparatus 1, and newly determine the limit value of the fixing power on the basis of the newly estimated characteristics of the secondary-side power value. According to the above configuration, the control device 40 can cause the limited fixing power to correspond to the secondary-side power with high accuracy. Therefore, the fixing power can be increased.

Other Embodiments

Examples of the embodiments of the present invention have been described. However, the present invention is not limited to the above-described embodiments. That is, various alterations and improvements can be made within the scope of the present invention. For example, a form obtained by applying various alterations to the embodiment, and a form constructed by combining constituent elements in the different embodiments are also included in the scope of the present invention.

For example, the control device 40 according to the embodiment has determined the limit value of the fixing power on the basis of the characteristic of the secondary-side power value in the period for forming an image on two sheets. However, an embodiment is not limited to the case.

The control device 40 may determine the limit value of the fixing power on the basis of a characteristic of the secondary-side power value in a period for forming an image on one sheet, or on the basis of a characteristic of the secondary-side power value in a period for forming an image on three or more sheets.

Further, the control device 40 according to the embodiment has adopted the value obtained by subtracting the secondary-side power from the rated power of the image forming apparatus 1 as the limit value of the fixing power. However, an embodiment is not limited to the case. In a case where there is a constituent element that consumes AC power other than the fixing heaters in the image forming apparatus 1, the power consumption of the constituent element may be taken into consideration.

Furthermore, the present invention also includes a control method. For example, a control method is a method for controlling an image forming apparatus that forms an image on a recording medium, the control method including acquiring a consumed DC power value that is a DC power value consumed in the image forming apparatus, estimating a characteristic of the consumed DC power value in a period in which an image is formed on at least the one recording medium, determining a limit value of fixing power that is power to be supplied to a fixing device of the image funning apparatus that fixes an image on the recording medium, to have cyclicity corresponding to the characteristic of the consumed DC power value, and outputting a command to supply the fixing power to the fixing device at a value not greater than the limit value of the fixing power. According to this control method, effects similar to the effects of the control device 40 according to the embodiment can be obtained. Such a control method may be implemented by a circuit such as a CPU or an LSI, an integrated circuit (IC) card, a single module, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A control device configured to control an image forming apparatus to form an image on a recording medium, the control device comprising circuitry configured to:
    detect a maximum value and a minimum value of a consumed direct current (DC) power value in a period in which an image is formed on at least one recording medium, the consumed DC power value being a DC power value consumed in the image forming apparatus;
    estimate, based on the detected maximum value and the detected minimum value, an amplitude and a cycle of the consumed DC power value; and
    determine a limit value of fixing power to be supplied to a fixing device of the image forming apparatus that fixes an image on a recording medium, to have an amplitude and a cycle corresponding to the amplitude and the cycle of the consumed DC power value.

2. The control device according to claim 1, wherein the fixing power has cyclicity, and one cycle of the limit value of the fixing power is an integral multiple of a cycle of the fixing power.

3. The control device according to claim 1, wherein the circuitry is configured to estimate the amplitude and the cycle of the consumed DC power value in a period in which an image is formed on at least two recording media.

4. The control device according to claim 1, wherein the circuitry is configured to determine, as a preset limit value, the limit value of the fixing power in a target period for which the circuitry estimates the amplitude and the cycle of the consumed DC power value.

5. The control device according to claim 1, wherein, in a case where a sum of the consumed DC power value and the limit value of the fixing power exceeds rated power of the image forming apparatus, the circuitry is configured to newly estimate an amplitude and a cycle of the consumed DC power value in the period in which an image is formed on the at least one recording medium, and newly determine a limit value of the fixing power based on the amplitude and the cycle of the consumed DC power value newly estimated.

6. An image forming apparatus comprising the control device according to claim 1.

7. A method for controlling an image forming apparatus that forms an image on a recording medium, the method comprising:
    detecting a maximum value and a minimum value of a consumed direct current (DC) power value in a period in which an image is formed on at least one recording medium, the consumed DC power value being a DC power value consumed in the image forming apparatus;
    estimating, based on the detected maximum value and the detected minimum value, an amplitude and a cycle of the consumed DC power value;
    determining a limit value of fixing power that is power to be supplied to a fixing device of the image forming apparatus that fixes an image on a recording medium, to have an amplitude and a cycle corresponding to the amplitude and the cycle of the consumed DC power value; and
    outputting a command to supply the fixing power to the fixing device at a value not greater than the limit value.

8. The method according to claim 7, wherein the fixing power has cyclicity, and one cycle of the limit value of the fixing power is an integral multiple of a cycle of the fixing power.

9. The method according to claim 7, wherein the estimating includes estimating the amplitude and the cycle of the consumed DC power value in a period in which an image is formed on at least two recording media.

10. The method according to claim 7, wherein the determining includes determining, as a preset limit value, the limit value of the fixing power in a target period for which the estimating estimates the amplitude and the cycle of the consumed DC power value.

11. The method according to claim 7, wherein, in a case where a sum of the consumed DC power value and the limit value of the fixing power exceeds rated power of the image forming apparatus, the estimating includes newly estimating an amplitude and a cycle of the consumed DC power value in the period in which an image is formed on the at least one recording medium, and the determining includes newly determining a limit value of the fixing power based on the amplitude and the cycle of the consumed DC power value newly estimated.

12. A control device configured to control an image forming apparatus to form an image on a recording medium, the control device comprising:
   means for detecting a maximum value and a minimum value of a consumed direct current (DC) power value in a period in which an image is formed on at least one recording medium, the consumed DC power value being a DC power value consumed in the image forming apparatus;
   means for estimating based on the detected maximum value and the detected minimum value, an amplitude and a cycle of the consumed DC power value; and
   means for determining a limit value of fixing power to be supplied to a fixing device of the image forming apparatus that fixes an image on a recording medium, to have an amplitude and a cycle corresponding to the amplitude and the cycle of the consumed DC power value.

* * * * *